(12) United States Patent
Kuku

(10) Patent No.: US 9,045,337 B2
(45) Date of Patent: Jun. 2, 2015

(54) WASTE MATERIAL, COAL, USED TIRES AND BIOMASS CONVERSION TO ALTERNATIVE ENERGY AND SYNTHETIC FUELS SOLUTIONS SYSTEM WITH CARBON CAPTURE AND LIQUEFACTION

(76) Inventor: Lai O. Kuku, Gilbert, AZ (US)

( * ) Notice: Subject to any disclaimer, the term of this patent is extended or adjusted under 35 U.S.C. 154(b) by 877 days.

(21) Appl. No.: 13/169,326

(22) Filed: Jun. 27, 2011

(65) Prior Publication Data

US 2012/0032452 A1 Feb. 9, 2012

Related U.S. Application Data

(60) Provisional application No. 61/371,738, filed on Aug. 9, 2010.

(51) Int. Cl.

| | |
|---|---|
| *C10K 1/00* | (2006.01) |
| *C10K 1/20* | (2006.01) |
| *C10J 3/00* | (2006.01) |
| *C01B 3/52* | (2006.01) |
| *C01B 3/34* | (2006.01) |
| *C01B 3/48* | (2006.01) |
| *C01B 3/56* | (2006.01) |
| *C10K 1/10* | (2006.01) |
| *C10K 3/04* | (2006.01) |

(52) U.S. Cl.

CPC . *C01B 3/52* (2013.01); *C01B 3/342* (2013.01); *C01B 3/48* (2013.01); *C01B 3/56* (2013.01); *C01B 2203/0283* (2013.01); *C01B 2203/0415* (2013.01); *C01B 2203/047* (2013.01); *C01B 2203/0475* (2013.01); *C01B 2203/048* (2013.01); *C01B 2203/0485* (2013.01); *Y02E 20/18* (2013.01); *Y02E 50/12* (2013.01); *Y02E 50/32* (2013.01); *C10K 1/003* (2013.01); *C10K 1/10* (2013.01); *C10K 1/205* (2013.01); *C10K 3/04* (2013.01); *C10J 2300/093* (2013.01); *C10J 2300/0943* (2013.01); *C10J 2300/0946* (2013.01); *C10J 2300/1238* (2013.01); *C10J 2300/1606* (2013.01); *C10J 2300/1612* (2013.01); *C10J 2300/165* (2013.01); *C10J 2300/1659* (2013.01); *C10J 2300/1671* (2013.01); *C10J 2300/1678* (2013.01); *C10J 2300/1684* (2013.01); *C10K 1/007* (2013.01); *Y02E 20/16* (2013.01); *Y02E 20/185* (2013.01)

(58) Field of Classification Search

CPC .......................... C10J 2300/1612; C10K 1/005
USPC ........................................................ 48/197 R
See application file for complete search history.

(56) References Cited

U.S. PATENT DOCUMENTS

| | | | |
|---|---|---|---|
| 2005/0230659 A1* | 10/2005 | Hampden-Smith et al. | .. 252/189 |
| 2008/0098654 A1* | 5/2008 | Cherry et al. | ... 48/101 |
| 2008/0135457 A1* | 6/2008 | Ridge | ... 208/427 |
| 2008/0202028 A1* | 8/2008 | Tsangaris et al. | ... 48/73 |
| 2012/0128560 A1* | 5/2012 | Krishnamurthy et al. | .... 423/226 |

* cited by examiner

*Primary Examiner* — Matthew Merkling
(74) *Attorney, Agent, or Firm* — J. W. Burrows

(57) ABSTRACT

The system contained within this application for non-provisional patent protection provides the ability to convert municipal solid waste materials, used tires, various biomass including wood chips and other agricultural waste, and the addition of coal into synthesis gas (syngas), with oxygen as plasma gas. The system will accommodate the possibility for variation in feedstock co-gasification of the various materials with plasma torches that will be embedded in a plasma gasification unit. One converted into synthesis gas (syngas), the syngas will be cleaned of acid gases and carbon dioxide (CO2). Carbon dioxide will be captured and converted for various industrial applications instead of being released into the atmosphere. Clean syngas generated by the system will become the gas fuel for various energy solutions including clean electricity, as substitute for natural gas, and ultra clean FT synthetic fuels.

9 Claims, 13 Drawing Sheets

WASTE MATERIAL, COAL, USED TIRES AND BIOMASS CONVERSION TO ALTERNATIVE ENERGY AND SYNTHETIC FUELS SOLUTIONS SYSTEM WITH CARBON CAPTURE AND LIQUEFACTION

I. INTRODUCTION

This Non-Provisional Utility patent application claim benefits of a previously filed Provisional Patent Application No. 61,371,738 filed Aug. 9, 2010 by Lai O. Kuku, as defined by the United States Patent and Trademark Office (USTPO). Millenium SynthFuels is an alternative fuel and energy venture, created with the goal of providing the United States of America with the ability to produce alternative renewable energy and synthetic fuels domestically. The information contained within this application is proprietary, including but not limited to processes, drawings/schematics, and research. As such, this application seeks patent protection for said information under United States patent laws. The general purpose of this application is to patent the processes and systems used for multiple types of energy conversion utilizing municipal solid waste, coal, used tires, and biomass. Where required, separate forms will be attached to this document in accordance with patent application guidelines set forth by the USTPO on their web site.

II. BRIEF DESCRIPTION OF BACKGROUND, PROCESS, AND DRAWINGS a) Background of Process Lai O. Kuku created a new concept in alternative fuels and renewable energy, and hereby tenders a Non-Provisional Utility United States patent application to the United States Patent and Trademark Office for early receipt and confirmation, and also for examination and issue of the patent. Lai O. Kuku claims rights to the claimed processes described herein, and requests United States patent protection of the processes detailed herein, construction and operation of facilities designed to utilize the overall process contained herein, and materials generated by any use of the processes and methods for which this patent application is being submitted. Emerging technologies for alternative fuel sources such as Coal to Liquids (CTL) and Biomass to Liquids (BTL) have not progressed because of the solutions required for reducing acid gases and carbon dioxide emissions. Lai Kuku has created a different concept in alternative fuels and renewable energy. The technology and process flow utilizes a combination and variation of municipal solid waste, coal, used tires and biomass as feedstock that will be converted to synthesis gas (syngas). Parts of the process includes mechanisms and equipment to be incorporated in the process flow to control/remove various acid gases including carbonyl sulfide, hydrogen sulfide, methane, hydrochloric acid, mercury and sulfur oxides, sulfur compounds, and carbon dioxide. Carbon dioxide will be removed and liquefied for various industrial uses and all acid gases will be trapped as they are removed from the syngas stream. The remaining clean stream of syngas comprising of only hydrogen and carbon monoxide will be further converted providing multiple renewable energy solutions including clean electricity, substitute natural gas, and ultra clean synthetic transportation fuels. No energy plant, research and development data, or global facility exists, with any intent, or proposal that shows a complete process flow for a multiple energy solutions, utilizing the combination and variation of municipal solid waste, coal, biomass, and used tires as feedstock for clean energy output solutions. Lai O. Kuku (inventor) hereby tenders the Waste Material, Coal, Used Tires and Biomass Conversion to Alternative Energy and Synthetic Fuels Solutions System with Carbon Capture and Liquefaction (CCLS)™. Complete details of the process flow have been included in the following pages of this documentation.

b) Summary of Process

The process flow includes the conversion of municipal waste, coal, oil industry waste, lignocellulosic biomass, and used tires, with carbon capture, liquefaction and storage (CCLS), providing clean Syngas, ultra-clean Fischer-Tropsch synthetic fuels, synthetic oil/lubricants, and liquefied carbon dioxide. The process utilizes a physical acid gas removal system that uses cold methanol as a solvent to capture carbon dioxide and dissolve methane during the process. After capture, a combination of pressure and temperature regulation allows the $CO_2$ to be liquefied, stored, and transported to facilities for industrial or commercial use such as in Enhanced Oil Recovery (EOR), dry cleaning industry, food preservation, carbonation, and much more. This portion of the process removes $CO_2$ from the fuels generated by the overall process, and produces clean syngas for use as the gas fuel for clean electricity, substitute natural gas, and ultra clean synthetic fuel, and is the summary of the Waste Material, Coal, Used Tires and Biomass Conversion to Alternative Energy and Synthetic Fuels Solutions System with Carbon Capture and Liquefaction (CCLS), producing Hydrogen, Synthetic Fuels, Oils and Lubricants, Substitute Natural Gas and Clean Electricity, protected under U.S. Provisional Patent Application No. 61,371,738 filed Aug. 9, 2010

III. SPECIFICATION a) Title of Invention

Figure 1:
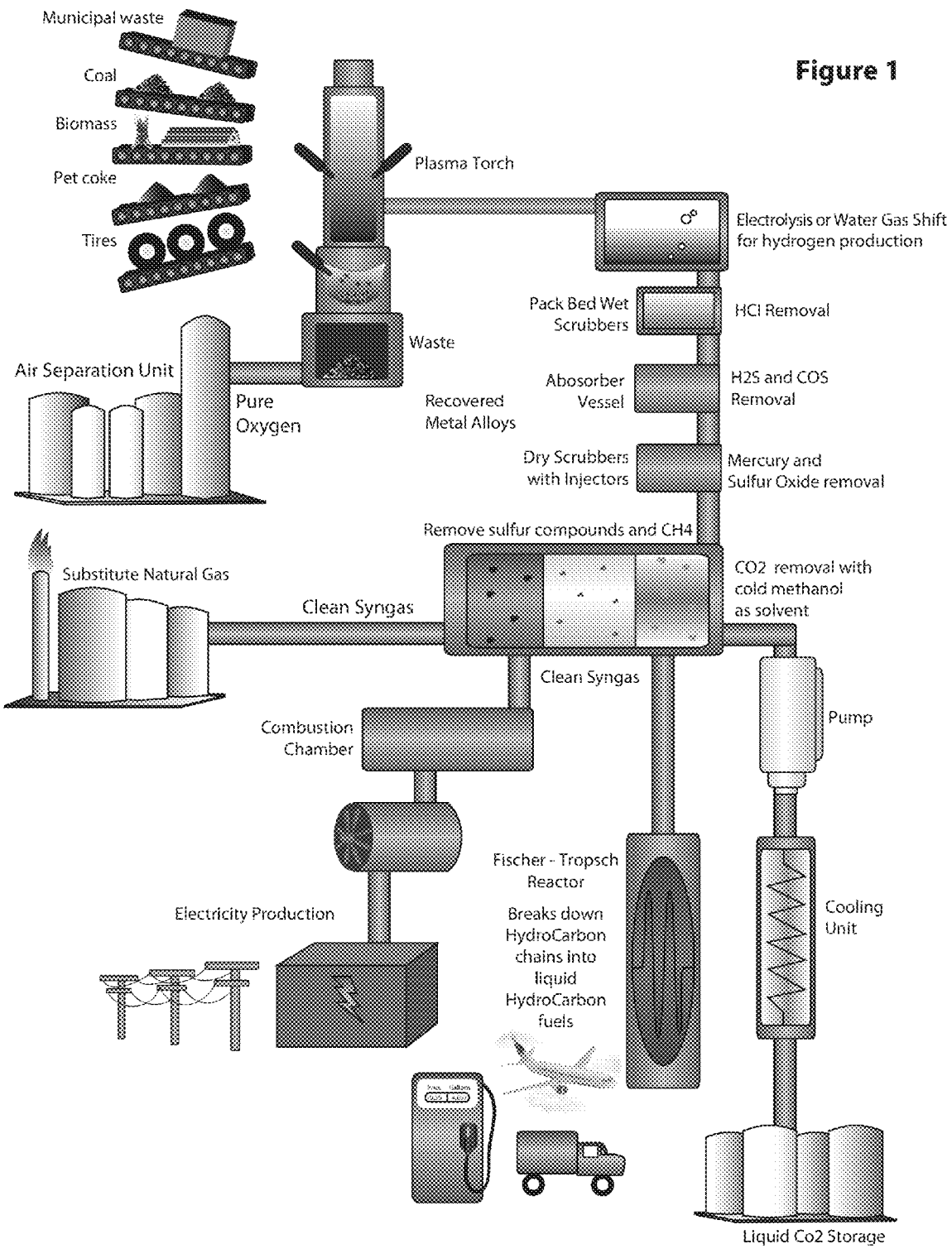
FIG. 1 demonstrates the complete process flow of the proposed Waste Material, Coal, Used Tires and Biomass Conversion to Alternative Energy and Synthetic Fuels Solutions System with Carbon Capture and Liquefaction (CCLS).
Figure 1B:
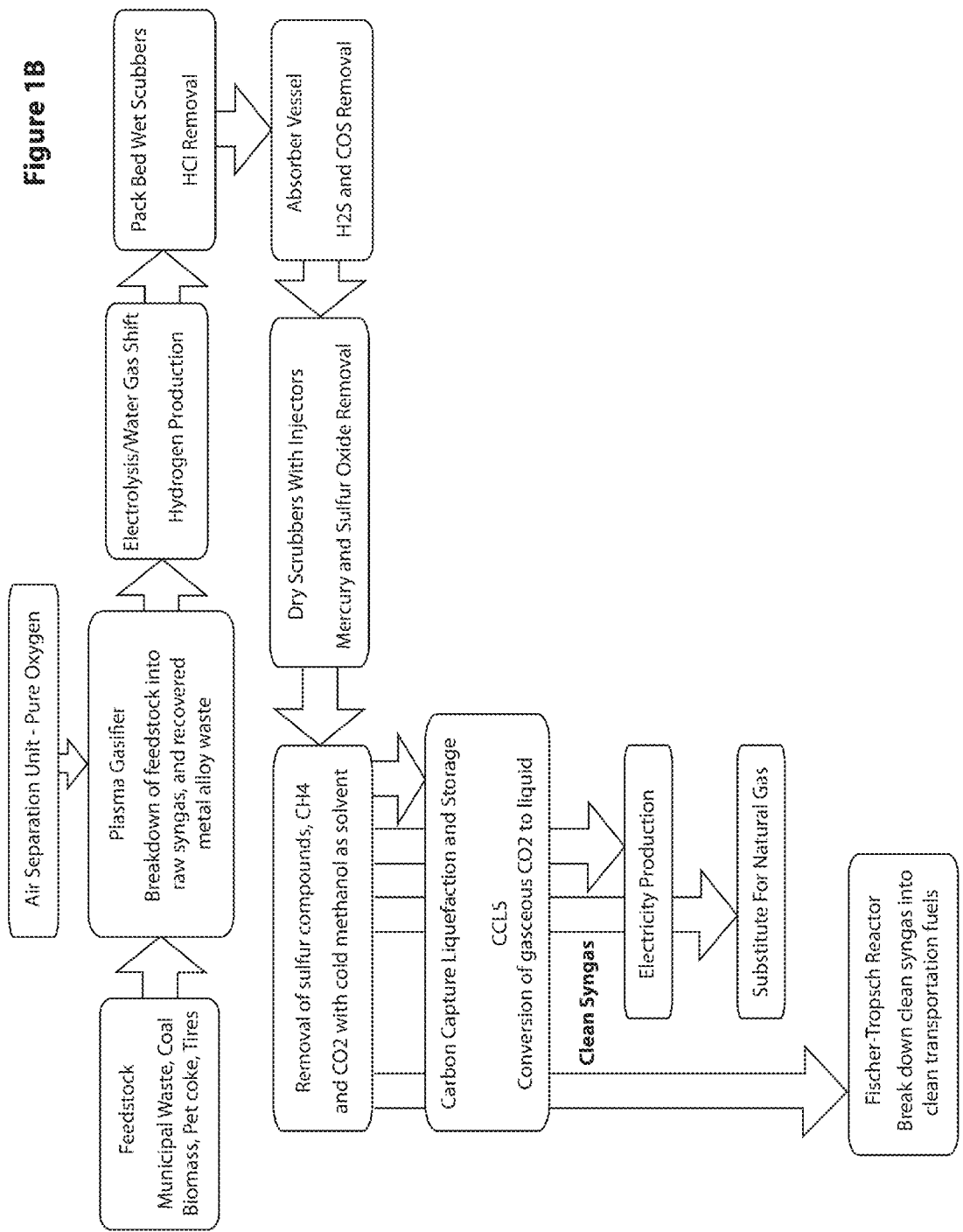
FIG. 1B is the process flow of the complete process flow of the proposed Community Solid Waste, Coal, Used Tires and Biomass Conversion to Alternative Energy and Fuels Solutions System with Carbon Dioxide Capture and Liquefaction. The first stage of the process is the gasification of municipal solid waste, coal, lignocellulosic biomass, used tires, and various industry liquid waste materials into synthesis gas (Syngas), which will be further processed into multiple clean energy solutions.
Figure 2:
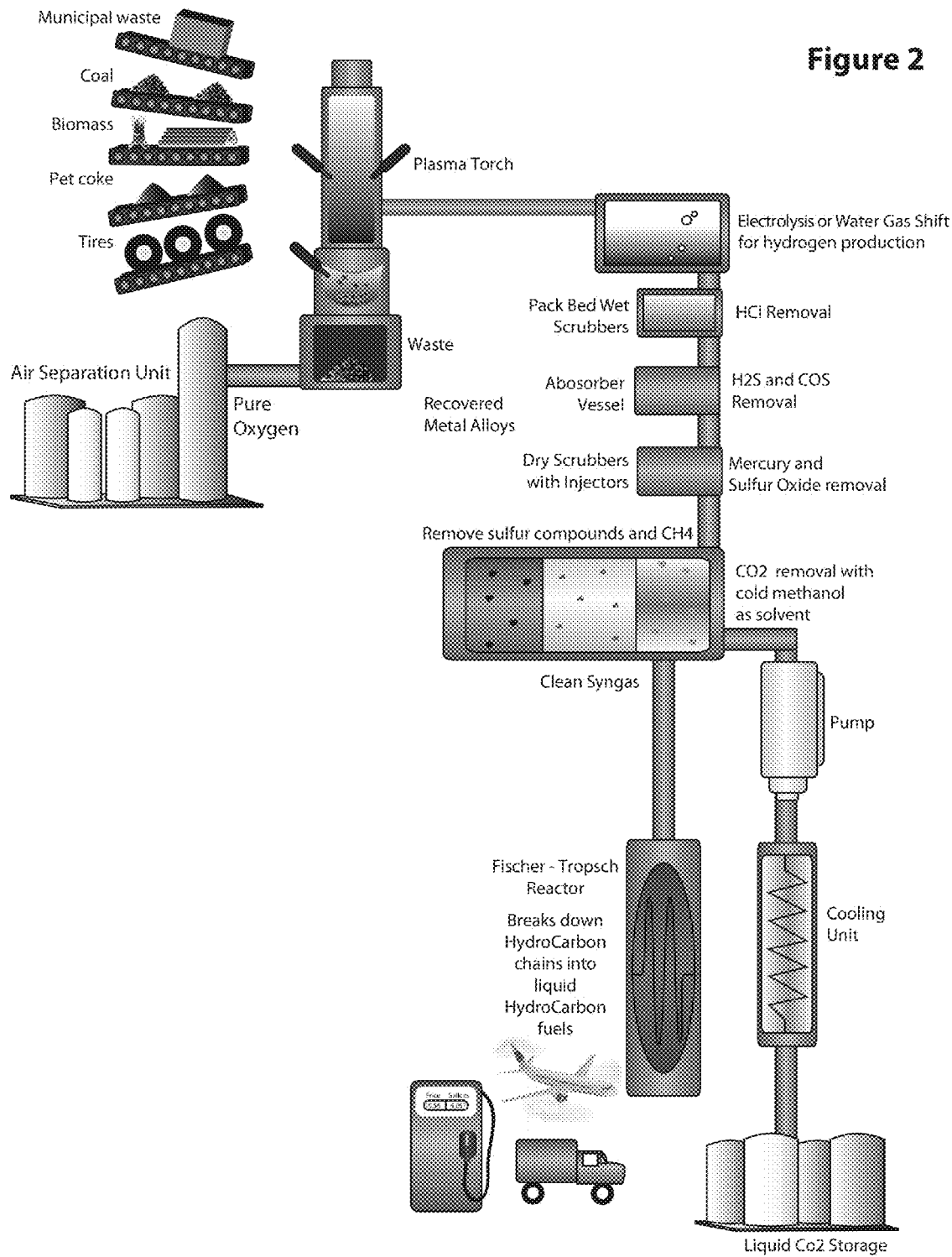
FIG. 2 is the complete schematic of the Alternative Energy and Synthetic Fuels Solutions System, with the various stages from gasification, Syngas cooling with hydrogen production, syngas cleanup, and production of ultra clean Synthetic Fuels, incorporating Carbon Dioxide Capture, Liquefaction and Storage.

Waste Material, Coal, Used Tires and Biomass Conversion to Alternative Energy and Synthetic Fuels Solutions System with Carbon Capture and Liquefaction (CCLS)™ b) Description of the Preferred Embodiment 1.0 Cleaner Energy Solutions System Preamble In the United States today, alternative energy solutions are perceived to be Nuclear, Wind and Solar Power technologies. While those technologies will provide some solutions, they still need to mature. What is more important is the aforementioned technologies and solutions are limited and don't address clean alternative solutions for transportation fuels, the largest energy sector in the United States. Emerging technologies for alternative fuel sources such as Coal to Liquids (CTL) and Biomass to Liquids (BTL) has not progressed because of various reasons including the cost and conversion efficiency of available plasma gasifiers, gasifier design, and most importantly, none of the proposed R&D solution have successfully addressed or provided any tangible and cost effective emission control of various harmful acid gasses including sulfur and mercury oxides, hydrogen and carbonyl sulfides, mercury and sulfur oxides, hydrochloric acid, and the solution for the solutions required for reducing carbon dioxide emissions. As such, most R&D into waste material, used tires, and biomass or coal to energy and synthetic fuels solutions and have failed to be realized, and continue to be expensive and unattainable.

Lai Kuku has created a different concept in alternative fuels and renewable energy. The technology and process flow utilizes a combination and variation of feedstock to include municipal solid waste (MSW), coal, used tires and biomass for co-gasification with the utilization of 2 to 4 plasma torches within a plasma gasifier, to efficiently and effectively convert municipal solid waste (MSW), coal, used tires and biomass into synthesis gas (syngas). An air separation unit ASU will be added to the gasification process. While outside air is adequate during the plasma gasification process, adding oxygen rather than, or in conjunction with outside air during the plasma gasification process helps maintain constant temperatures within the gasifier, which lowers the energy/power required by the plasma torch during the gasification process. While research on Modeling and performance analysis of an integrated plasma gasification combined cycle (IPGCC) power plant stipulated that the use of inert gases such as argon or nitrogen can improve performance and cost of plasma gasification process, we stipulate that the addition of a third or fourth plasma torch and the introduction of oxygen as plasma gas will lead to greater gasification efficiency, and lower gasification energy required for the gasification process. In addition, our feedstock range is not limited to municipal solid waste, but comprises of used tires, various lignocellulosic biomass including, and not limited to wood chips, forest and agricultural waste, and coal. The following benefits will be achieved:—

1. The power required by the ASU will not be very significant for operating costs
2. The combination and co-gasification of various waste materials other than MSW will provide lower feed costs
3. The introduction of oxygen as plasma gas, and the additional plasma torches lower plasma energy and increase gasification efficiency beyond 70%,
4. Overall gasification costs will be reduced.
5. The variety of feedstock co-gasified reduces the cost of feedstock, as well as the total cost of producing syngas by as much as 60%, with increased efficiency form 60% conversion ratio to over 75-85%.

Composition of synthesis gas by plasma gasification includes hydrogen, carbon monoxide, water, and nitrogen, with traces of hydrochloric acid, carbon dioxide and acid gases. While there might be slight variation in percentage of various gasses in the syngas stream, syngas composition below will be similar to the syngas composition of municipal solid waste show below.

| Gases | |
|---|---|
| Hydrogen | H2 |
| Carbon monoxide | CO2 |
| Nitrogen | N2 |
| Water | H2O |
| Carbon Dioxide | CO2 |
| Hydrochloric Acid | HCl |
| Methane | CH4 |
| Hydrogen Sulfide | H2S |
| Carbonyl Sulfide | COS |
| Oxygen | O2 |

The desired syngas composition is hydrogen and carbon monoxide gases. For most commercial uses, a desired H2/CO ratio of 0.6 to 1.1 or higher is required. To attain a H2/CO ratio of 1 or higher, a water gas shift WGS or electrolysis can be added. The water gas shift reaction increases the production of hydrogen which is essential for appropriate H2/CO ratios in commercial applications including the Fischer Tropsch (FT) synthesis.

Syngas Cleanup

Lai O. Kuku created the novel process flow that incorporates an elaborate cleanup system that addresses carbon dioxide and acid gas emissions. The proposed syngas cleanup system is an immense leap forward for gasification technologies in addressing syngas cleanup. Raw syngas temperature of 1200° C. or higher exiting the gasifier should be cooled to approximately 300 to 400° C. before the cleanup process begins. A heat recovery/quench system will be added to enable raw syngas to meet the temperature of the cleanup system. As previously shown, syngas composition will include traces of CO2, HCI, H2S and COS, which while negligible will be cleaned. Dry scrubbers with sorbent injectors that introduce limestone or hydrated lime into the gas streams will be added to control any trace of sulfur and nitrogen oxides. Syngas cleanup equipment will consist of packed bed wet scrubbers with sodium hydroxide solutions, absorber vessels, and filters. Small dry scrubbers and/or filters will be used for particulate matter control, while the packed bed scrubbers will be used to neutralize HCI. In addition to the packed bed wet scrubbers, an absorber vessel used for gas purification will be added in to control H2S and COS.

Carbon Dioxide Emissions Control

Carbon dioxide is a major green house gas (GHG). Coal fired plants have been and continue to be the major culprit in CO2 emissions. Consequently coal fired plants have negatively impacted the environment by contributing to CO2 concentrations in the atmosphere. With 7 Gt of carbon emissions annually, coal fired plants continually contribute to atmospheric CO2 concentrations. Along with the various aforementioned acid gas emissions, most biomass to liquid (BTL), coal to liquids (CTL), and integrated combined cycle (IGCC) R&D have had very limited success in addressing CO2 emissions. Proposed carbon capture and storage (CCS) research and development have not only been hindered by financial costs, CCS has been bogged with various issues including leakage of CO2 from underground aquifers.

Lai O. Kuku has created a novel, unique, and the most cost effective process that addresses and controls CO2 emissions.

As various acid gasses including HCI, H2S, and COS have been removed from the stream of syngas, any trace of methane (CH4) will also be removed. The Rectisol wash is a physical acid gas removal system that uses cold methanol as a solvent to remove CO2 separately from gas streams. With the use of cold methanol as a solvent, syngas stream cleaned of HCI, H2S, and COS, CH4 and CO2 can now be controlled. With cold methanol as a solvent, traces of methane will be dissolved and carbon dioxide (CO2) will be removed and captured in separate stream from the syngas flow. While most R&D have been focused on the captured CO2 to be sequestered and stored in aquifers and depleted oil and gas well, the results have not been favorable. The current CCS projects have faced cost and leakage issues. Lai O. Kuku has addressed this problem with the carbon Capture Liquefaction and Storage System incorporated into the syngas cleanup.

Carbon dioxide will be removed and liquefied for various industrial uses and all acid gases will be removed as well. The remaining clean stream of syngas comprising only Hydrogen and Carbon Monoxide will be will be further converted in providing multiple renewable energy solutions including clean electricity, substitute natural gas, and ultra clean synthetic transportation fuels. No energy plant, research and development data, or global facility exists, with any intent, or proposal that shows a complete process flow for a multiple energy solutions, utilizing municipal solid waste, Coal, biomass and used tires as feedstock for clean energy output solutions.

As such, Lai O. Kuku claims rights to the process described herein as an overall process flow, referred to as the Millenium SynthFuels Waste Materials, Coal, Used Tires and Biomass Conversion to Alternative Energy and Synthetic Fuels Solutions System with Carbon Dioxide Capture and Liquefaction (CCLS)

Figure 3:
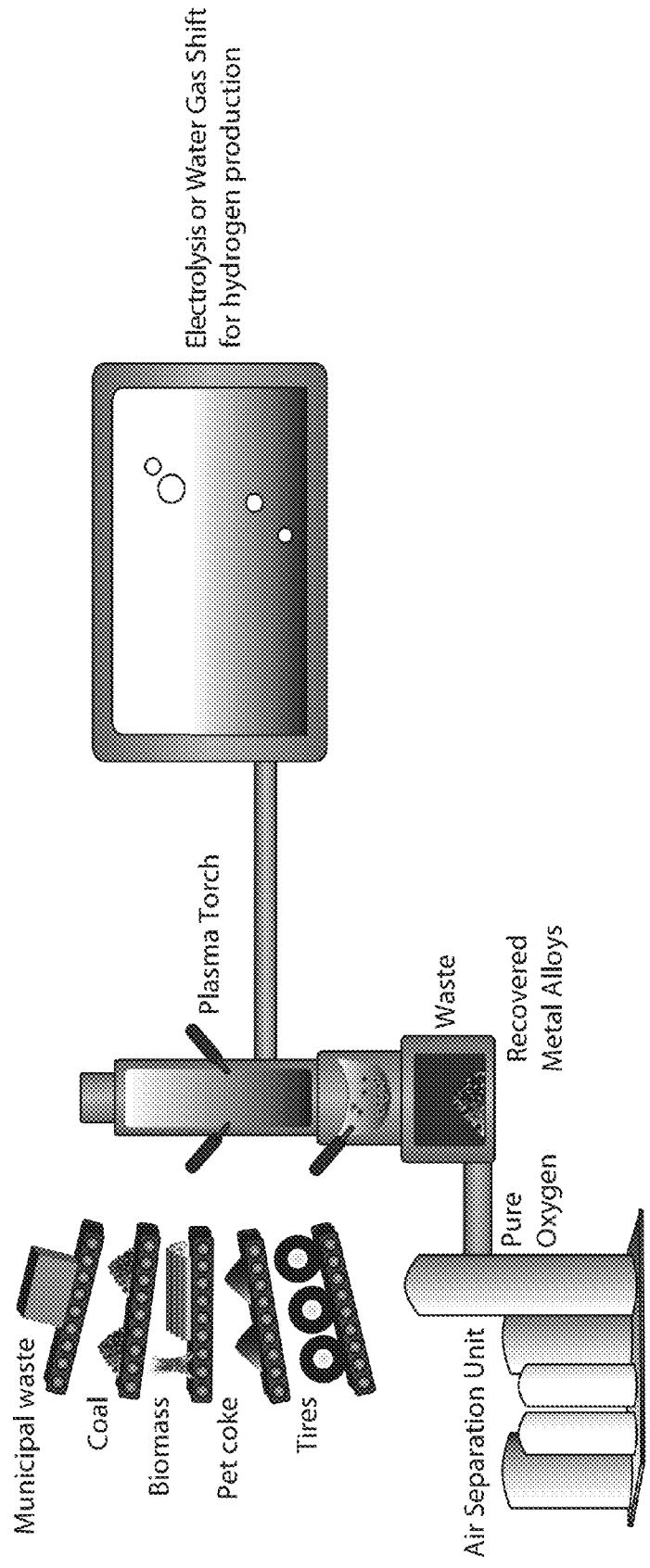
FIG. 3 details the Plasma gasifier with the various feedstock stages utilizing oxygen as plasma gas, through the addition of the water gas shift (WGS)/hydrolysis for addition hydrogen production and syngas equilibrium phase.
Figure 4:
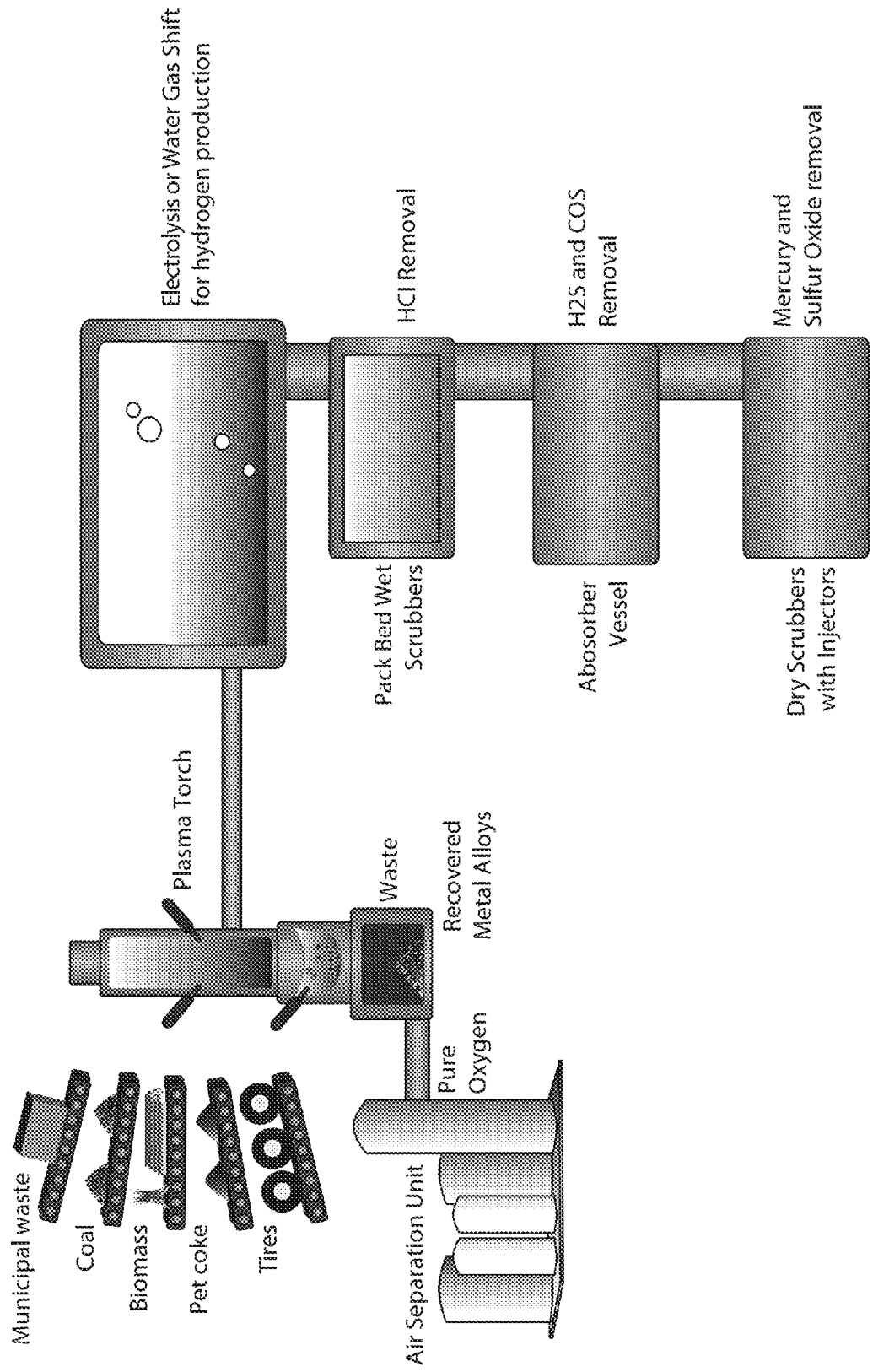
FIG. 4 displays syngas exiting the WGS/hydrolysis phase and entering the syngas cleanup phase into the packed bed wet scrubbers for HCl control, the absorber vessel for H2S and COS removal, and the dry scrubbers with limestone/hydrated lime injectors for mercury and sulfur oxide control.
Figure 5:
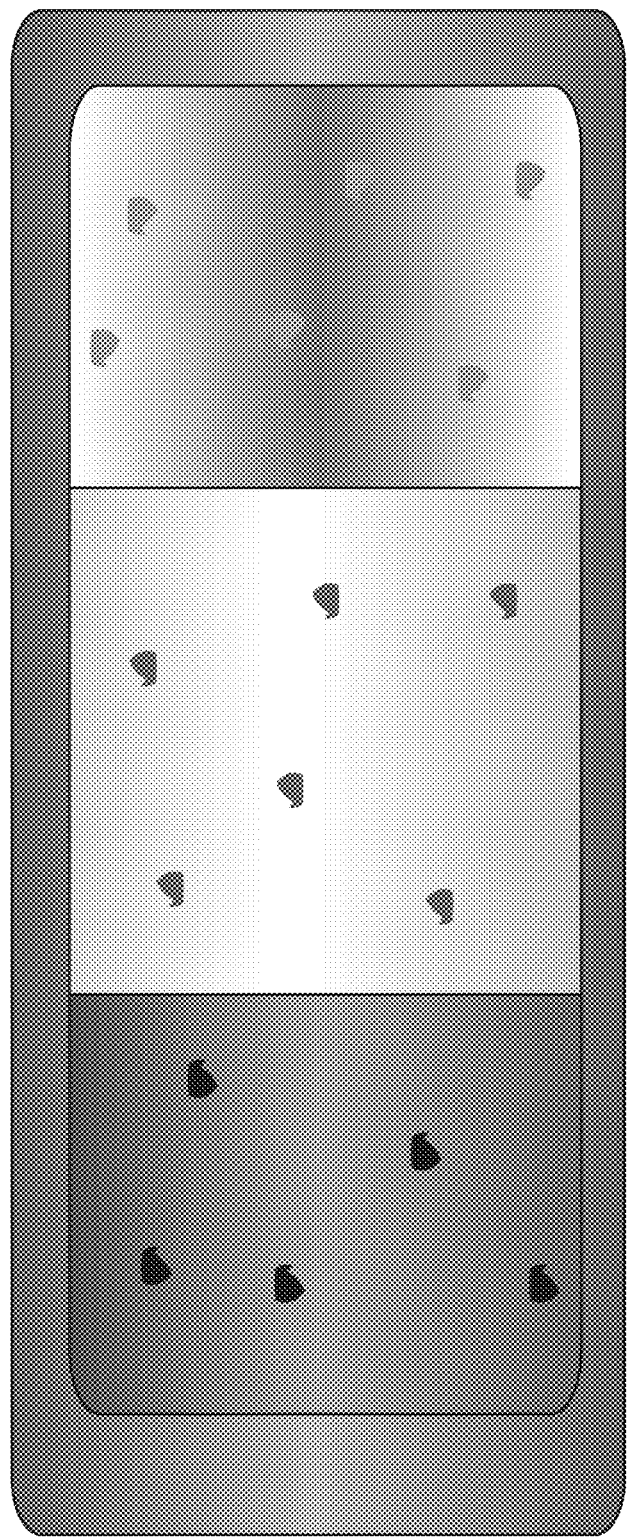
FIG. 5 is the physical acid gas removal system utilizing cold methanol to dissolve traces of methane present, as well as for the capture of carbon dioxide gas.

2.0 Waste Material, Coal and Biomass Conversion to Alternative Energy and Ultra Clean Synthetic Fuels Solution System 2.1 Feedstock Gasification There are three states of matter, solid, liquid, and gas. Plasma is "the fourth state of matter," existing as an ionized gas with electrons that carry a current and generate a magnetic field. Natural plasma exists only at very high temperatures in excess of 20,000° C., and as such can vaporize materials it encounters. Naturally occurring plasma can be found in the stars, lightning, and other high-energy reactions that exist in the universe. Artificial plasma is possible by using electrical charges on various gases. Plasma-arc technology uses very high voltage electrical energy at high temperatures to create an electrical arc. Temperatures within a plasma gasifier range from 4,000-8,000° F., which enables the breakdown of solid waste materials, used tires, coal, and biomass into their basic elements in a gaseous form, separating molecules into individual atoms. FIG. 3A displays the Plasma gasifier with the various feedstock. Our proposed plasma gasifying unit with 2-4 plasma torches will be able to process solid, liquid and gaseous waste materials including oil industry wastes, Municipal Solid Wastes, Straw, Hay, Wood Chips, Used Tires and Coal in varied feed streams or concurrently, into Synthesis Gas (Syngas). The feedstocks are converted to gas which exits the top of the gasifier, while solid residue consisting mostly of slag and metallic alloys are recovered at the bottom of the gasifier. The slag and metal alloys material will be collected and sold to various industries for use in road surfacing, as roofing materials, and in the manufacture of various building materials 2.2 Syngas Cooling and Hydrogen Production FIG. 3 demonstrates the beginning of the processes, from raw material induction, to plasma gasification, then entry into the water-gas shift. A built in quench system reduce syngas temperature as it exits the gasifier. The water-gas shift is used for additional cooling and also to attain a balanced mixture of gases. Consequently, carbon monoxide in the raw syngas undergoes a chemical reaction with water creating additional carbon dioxide and hydrogen. The hydrogen produced can be utilized for many products including the reforming of methane, and the upgrade or hydrogenation of Fischer-Tropsch synthetic fuels. The Millenium SynthFuels Energy and Fuels Solutions System incorporate in the process flow the utilization of hydrogen generated in the Water Gas Shift for the hydrogenation upgrade of FT synthetic fuels. In addition, this process will also serve as the hydrogen gas source that will be piped and sold for commercial use in hydrogen fuel cells. Furthermore, the additional hydrogen produced could also be used to maintain richer hydrogen to carbon monoxide ratio in the syngas stream.

2.3 Syngas Cleanup

Synthesis gas (Syngas) is a combination of hydrogen, carbon monoxide, carbon dioxide and various acid gasses, including various oxides and sulfides. With CO2 concentration stated at 360 ppm of total carbon emissions, CO2 and acid gas emissions must be addressed. This system incorporates many avenues with design to prevent acid gas emissions, and the capture of pure CO2 emissions. As syngas leaves the gasifier, it is sent through a gas conditioner water shift, which cools the gas temperature and also generates additional hydrogen and carbon dioxide. As the desired syngas composition is hydrogen and carbon monoxide, carbon dioxide, acid gases and particulate matter will be removed. Syngas composition will include traces of CO2, HCI, H2S and COS, which while negligible will be cleaned. Dry scrubbers with sorbent injectors that introduce limestone or hydrated lime into the gas streams will be added to control any trace of sulfur and nitrogen oxides. Syngas cleanup equipment will consist of packed bed wet scrubbers with sodium hydroxide solutions, absorber vessels, and filters. Small dry scrubbers and/or filters will be used for particulate matter control, while the packed bed scrubbers will be used to neutralize HCI. In addition to the packed bed wet scrubbers, an absorber vessel used for gas purification will be added in to control H2S and COS. The following process deals with CO2 emissions.

2.4 Carbon Capture Liquefaction and Storage (CCLS)™

Figure 6:
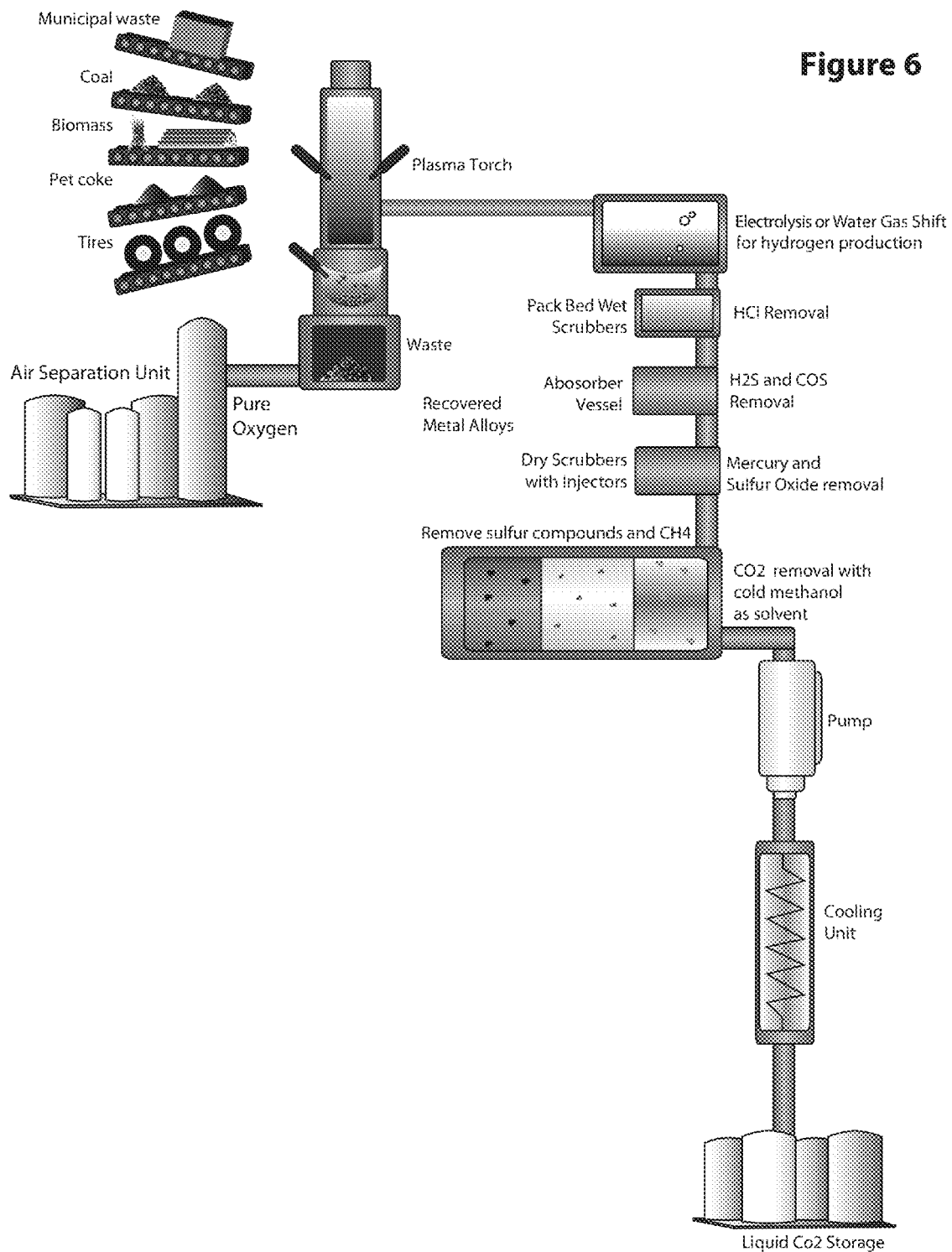
FIG. 6 displays the process flow from feedstock gasification stage to the cleanup of syngas with scrubbers, acid gas removal, carbon dioxide capture, and CO2 liquefaction for clean syngas production
Figure 7:
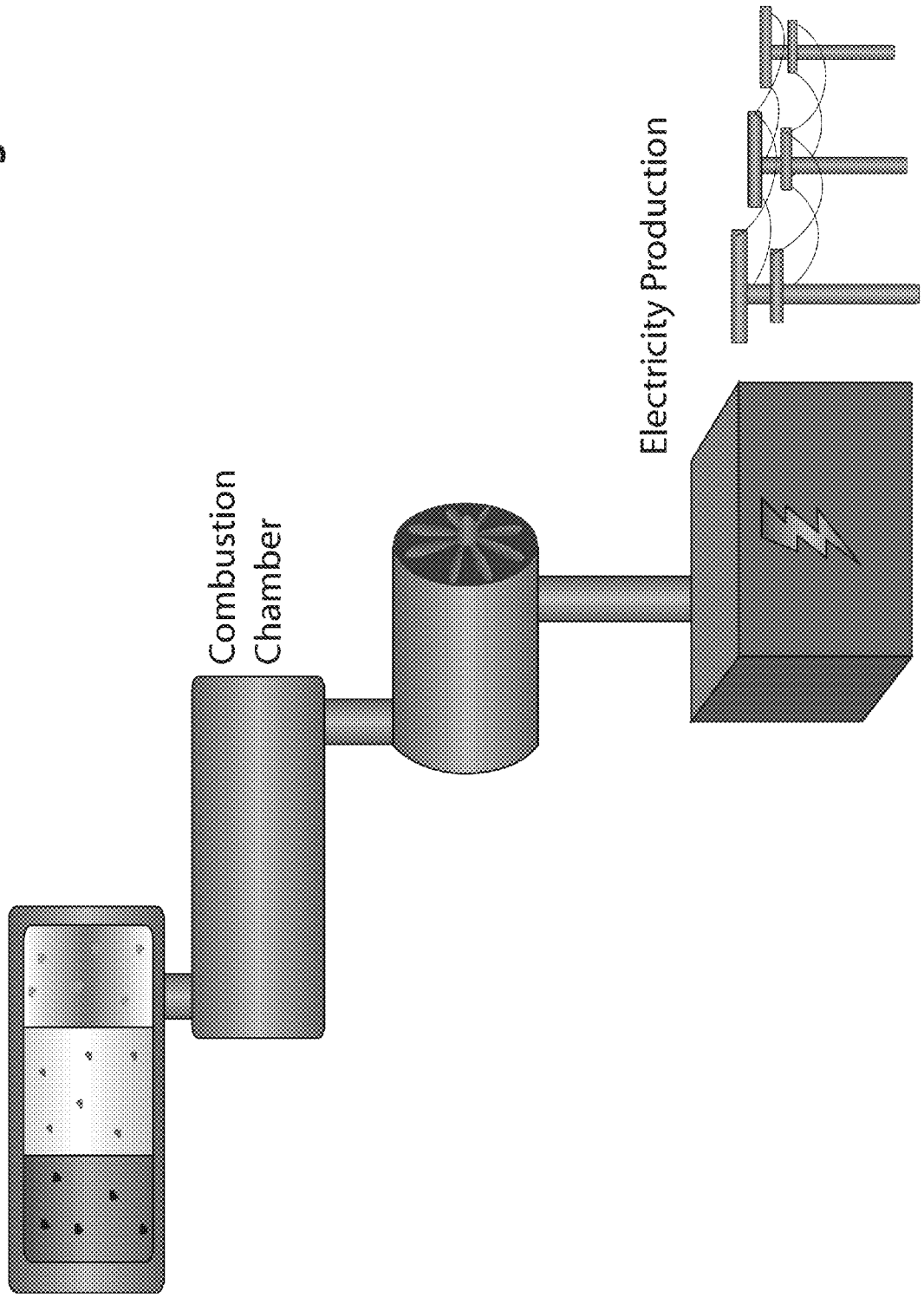
FIG. 7 is the drawing of the process from the gasification stages, syngas cleanup, to the use of gas turbine generators for internal plant electricity generation. Heat captured during the process can be used to power steam generators for additional electric power efficiently and economically.
Figure 7B:
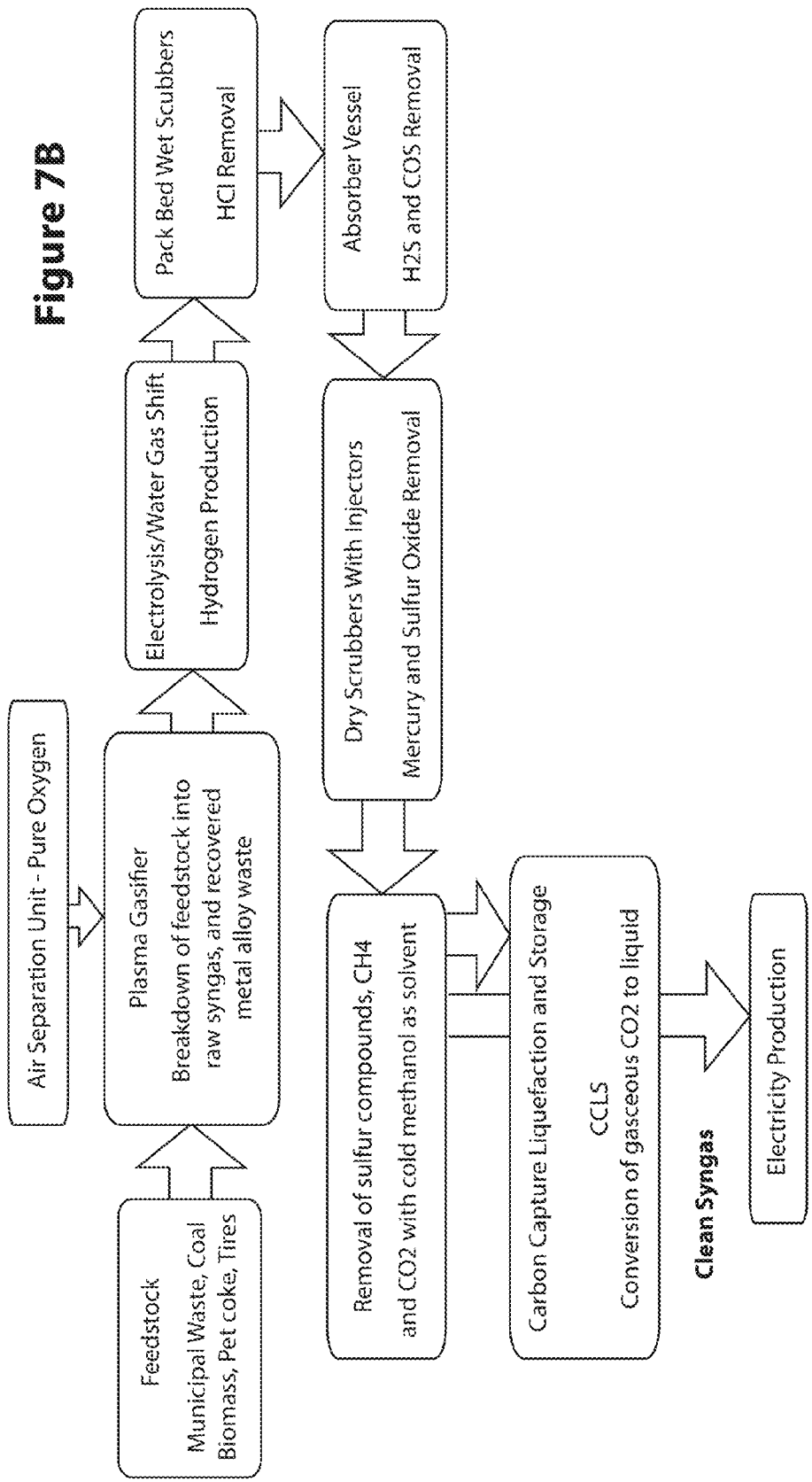
FIG. 7B is the process flow from feedstock gasification, syngas cleanup, and utilization of clean syngas for system electric power generation
Figure 8:
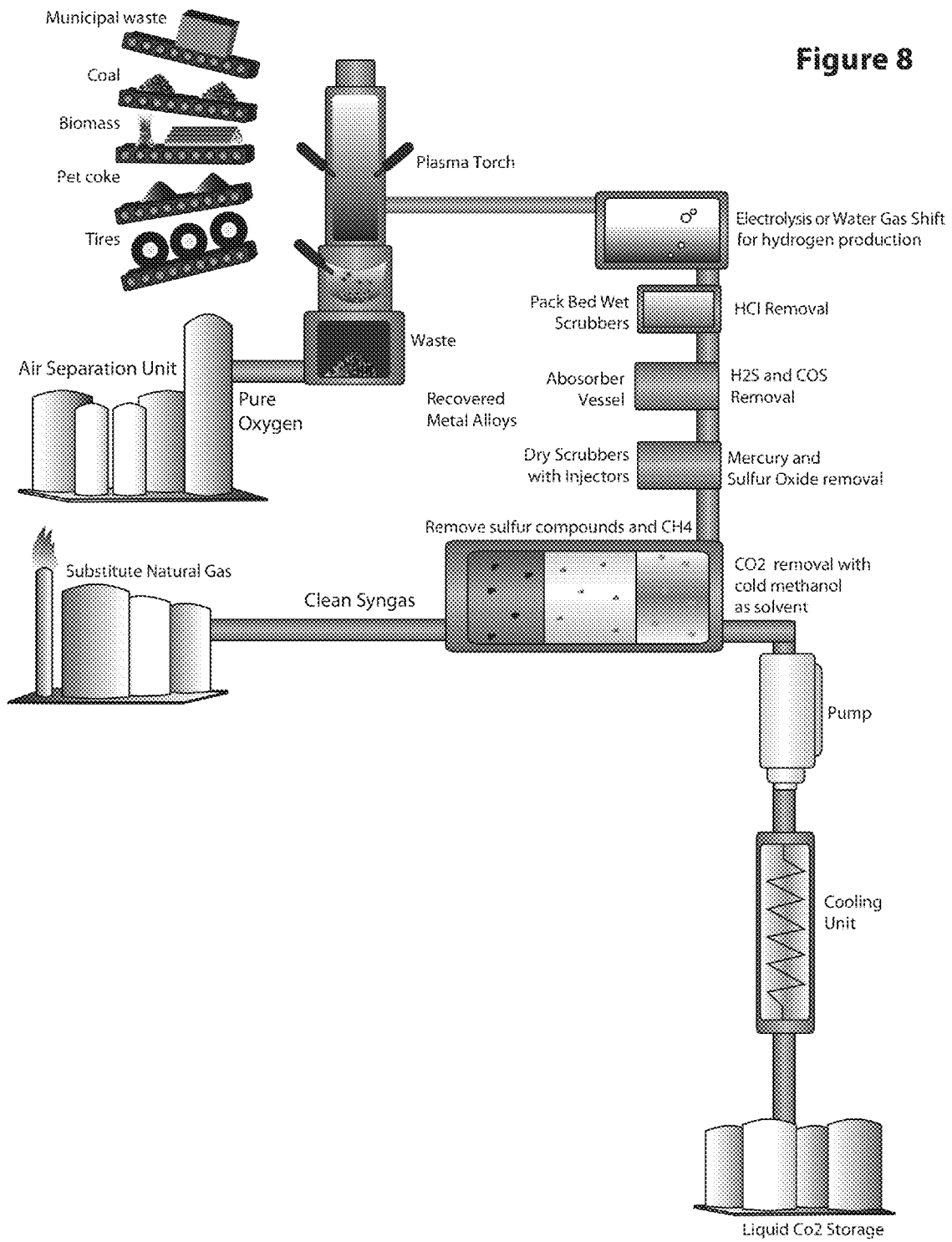
FIG. 8 shows the process from the gasification stages, syngas cleanup, including carbon capture liquefaction and storage to the output of clean syngas for use as substitute natural gas
Figure 8B:
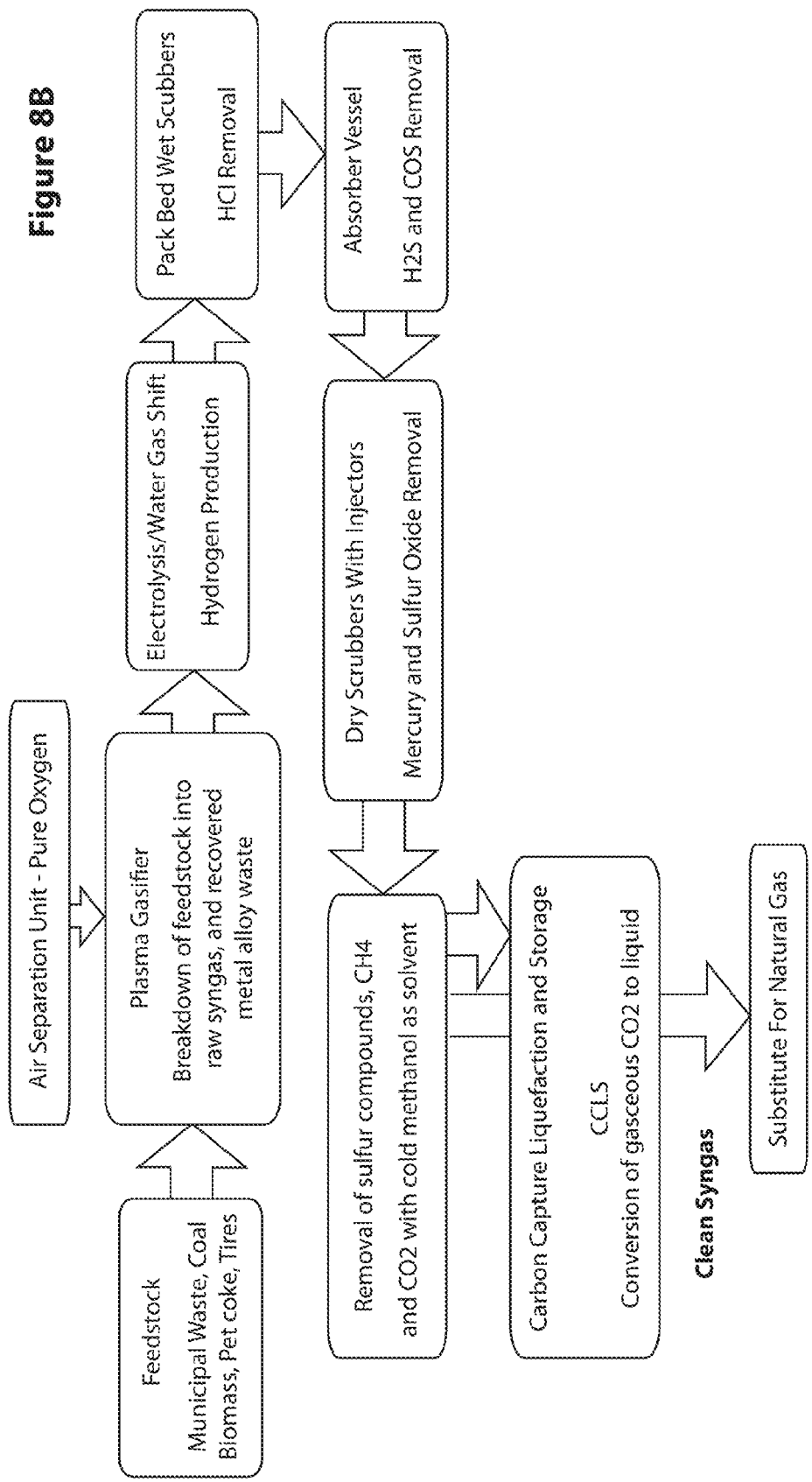
FIG. 8b is the process flow diagram for the generation of clean syngas as a substitute for natural gas. The process flow begins with the gasification phases through syngas cleanup, and ends with the flow of syngas as substitute natural gas
Figure 9:
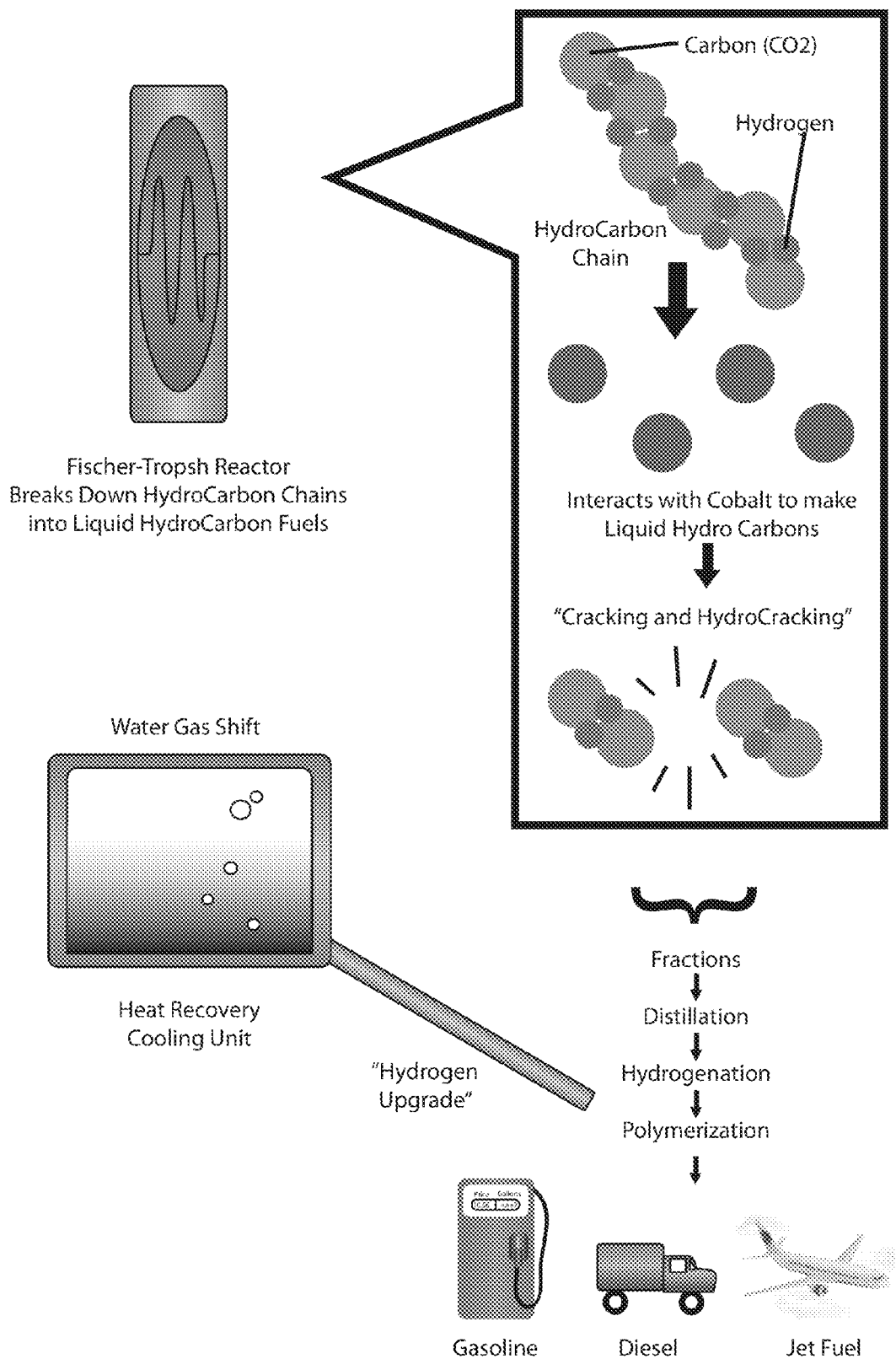
FIG. 9 shows process from the gasification of feedstock stage, through the syngas cleanup stages, with the addition of the Fischer Tropsch synthesis process for the conversion of clean syngas into ultra clean synthetic fuels.
Figure 9B:
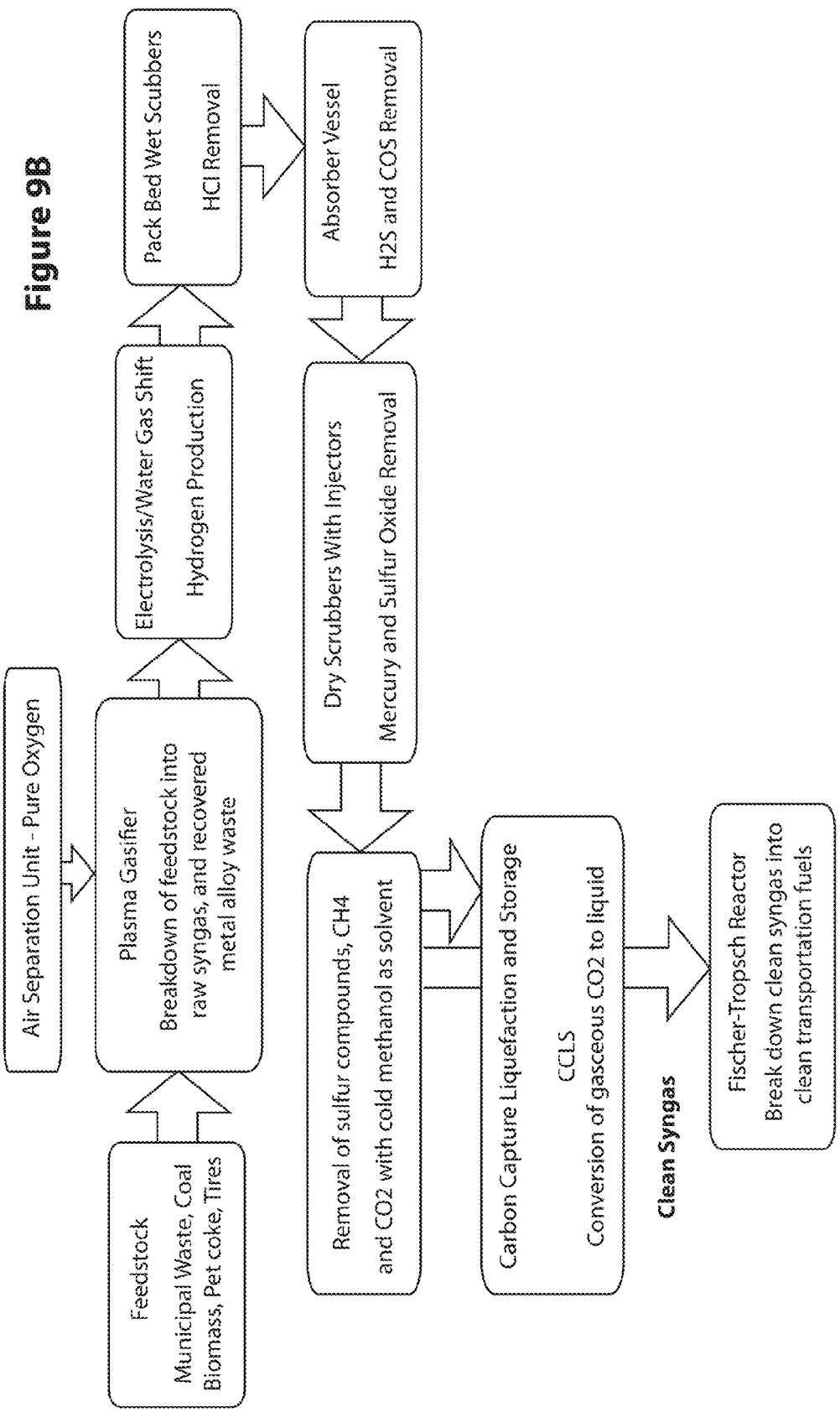
FIG. 9B is the process flow diagram of the gasification from feedstock the Fischer Tropsch synthesis process for the conversion of clean syngas into ultra clean synthetic fuels

FIG. 6 details the process of our new Carbon Capture Liquefaction and Storage. As raw Syngas enters the capture system, cold methanol is used as a solvent in removing carbon dioxide in separate streams from raw syngas. The captured CO2 will be liquefied and stored for various commercial uses and prevented from being released into the atmosphere. The critical or maximum temperature at which CO2 will remain in liquid state is 88 degrees Fahrenheit (31.1° C.), and at a minimum of 5.1 atm 73.5 psi. The captured stream of syngas is passed through a pressure system at a minimum of 5.1 atm, and a cooling unit where the gas temperature is reduced below 87 degrees Fahrenheit. Liquefied CO2 will be stored in tanks at above 5.1 atm to ensure it remains in liquid state, until transported for commercial applications such as in food processing, Enhanced Oil Recovery (EOR), and for various manufacturing processes. Our Carbon Capture Liquefaction and Storage process can be applied to various industries such as chemical manufacturing and coal fired power plants as the most ideal solution in preventing the release of harmful carbon dioxide emissions into the atmosphere. Once all acid gases have and CO2 have been removed, the gasification process results in a clean and highly rich syngas composition of hydrogen and carbon monoxide gas.

2.5 Clean Syngas as Substitute Natural Gas (SNG)

Natural gas carries energy that can produce both heat and power. In addition, natural gas can be substituted for syngas in the production of clean electricity and FT liquids. Syngas has similar properties as natural gas in energy carriage and in the production of heat and power. Once acid gases have been scrubbed and CO2 removed, clean syngas can undergo methanation, and gas reformation. The process enables the conversion of clean syngas into a substitute for natural gas, as well as compressed natural gas (CNG), or sold for use in chemical industries.

3.0 Fischer Tropsch (FT) Synthesis Process

In the FT process, the hydrogen and carbon monoxide in the syngas undergoes a catalyzed chemical reaction with a Cobalt, Iron, or Nickel based catalyst. In a cobalt based reactor, hydrogen and carbon monoxide in syngas undergoes a catalyzed chemical reaction with the cobalt, and becomes converted to different liquid hydrocarbons. More processing are still involved before the raw hydrocarbon liquids could be classified as fuels. Part of the additional process includes cracking, which breaks down the weighted hydrocarbon liquid chains into different weight hydrocarbon chain liquids. In addition, the hydrocarbon liquids undergo hydro-cracking, which involves the introduction of pressurized hydrogen and a catalyst. The process creates a reaction that changes and breaks down liquid hydrocarbon chains and purifies the hydrocarbon liquids from sulfur and nitrogen. This is the process that creates naphtha liquids including synthetic jet fuel, diesel, etc. The liquid fuels are further polymerized, hydrogenised, fractionated, and distilled in creating higher octane/cetane nitrogen free and ultra-low sulfur/sulfur free liquid fuels including gasoline, diesel, and synthetic jet fuels. Without clean syngas, no Fischer Tropsch system will be useful as they are directly dependent on high quality, hydrogen rich syngas composition, free from CO2 and other acid gases. With the aforementioned gasification and syngas cleanup process of clean syngas, any Fischer Tropsch reactors can effectively breakdown clean syngas into liquid hydrocarbon transportation fuels including diesel and synthetic jet fuel.

The invention claimed is:

1. A process for producing clean syngas from exhaust gas being emitted from a power plant that uses a variety of feedstock materials, comprising the process steps of:
   providing a gasification vessel using various plasma torches oriented at various positions within the gasification vessel to produces temperature therein up to generally 8000 degrees centigrade;
   directing the feedstock materials into the gasification vessel where the intense heat therein gasifies the feedstock materials to produce a synthesis gas (hereafter called syngas) containing hydrogen, carbon monoxide, water and nitrogen with carbon dioxide, traces amounts of hydrochloric acid and other acids while vaporing other undesirable elements;
   cooling the syngas as it exits the gasification vessel;
   directing the cooled syngas to one of an electrolysis process and a water-shift process to enrich the hydrogen content of the syngas to achieve a predetermined ratio between the hydrogen and the carbon monoxide to a lever of 0.6 or higher;
   directing the syngas through sequential steps to clean the syngas of various acids and unwanted particulate matter:
      step 1; passing the syngas through pack bed wet scrubbers containing a sodium hydroxide solution;
      step 2; passing the syngas through an absorber vessel used for gas purification to control hydrogen sulfide and carbonyl sulfide; and
      step 3; passing the syngas through dry scrubbers with sorbent injectors that introduce one of limestone and hydrated lime into the syngas to control any traces of sulfur and nitrogen oxides;
   directing the syngas from step 3 through a Rectisol wash containing cold methanol to dissolve any trace of methane and separate carbon dioxide from the syngas;
   capturing the carbon dioxide gas from the exhaust gas;
   converting the carbon dioxide gas to a liquid by cooling and pressurizing the captured carbon dioxide gas to a respective predetermined temperature and a predetermined pressure level;
   storing the liquefied captured carbon dioxide in storage tanks at the predetermined pressure and temperature levels; and
   directing the clean syngas that contains proportional amounts of hydrogen and carbon monoxide to other processes for renewable energy solutions.

2. The process of claim 1 wherein, in the step of providing a gasification vessel a source of oxygen is added to the gasification vessel to enhance the combustion therein.

3. The process of claim 1 wherein the feedstock may contain one or more of municipal solid waste, coal, biomass, pet coke, and used tires.

4. The process of claim 1 wherein, in the step of directing the cooled syngas the ratio of the hydrogen to the carbon monoxide is preferably greater than one.

5. The process of claim 4 wherein, the cooled syngas is directed through the water-shift process.

6. The process of claim 4 wherein, the cooled syngas is directed through the electrolysis process.

7. The process of claim 1 wherein, in the step of directing the syngas through sequential steps, in step 3 thereof limestone is injected through the sorbent injectors.

8. The process of claim 1 wherein, in the step of directing the syngas through a Rectisol wash the separated carbon dioxide gas is compressed to convert the gas to a liquid, stored under pressure and commercially sold.

9. The process of claim 1 wherein, in the step of directing the clean syngas, the clean syngas is directed to one or more of Fisher-Tropsch Reactor for making fuel, a combustion chamber and turbine for producing electricity, and a substitute for natural gas.

* * * * *